(12) United States Patent
Roth et al.

(10) Patent No.: US 8,974,908 B2
(45) Date of Patent: Mar. 10, 2015

(54) LABEL FILM FOR DEEP-DRAW PROCESSES

(75) Inventors: Mathias Roth, Zweibrücken (DE); Karl-Heinz Kochem, Neunkirchen (DE); Wilfrid Tews, Bechhofen (DE); Axel Mueller, Saarbrücken (DE)

(73) Assignee: Treofan Germany GmbH & Co. KG (DE)

( * ) Notice: Subject to any disclaimer, the term of this patent is extended or adjusted under 35 U.S.C. 154(b) by 582 days.

(21) Appl. No.: 12/669,503

(22) PCT Filed: Jun. 28, 2008

(86) PCT No.: PCT/EP2008/005302
§ 371 (c)(1),
(2), (4) Date: Apr. 28, 2010

(87) PCT Pub. No.: WO2009/010178
PCT Pub. Date: Jan. 22, 2009

(65) Prior Publication Data
US 2010/0326590 A1 Dec. 30, 2010

(30) Foreign Application Priority Data
Jul. 18, 2007 (DE) .................. 10 2007 033 371

(51) Int. Cl.
| | | |
|---|---|---|
| B32B 27/32 | (2006.01) |
| B32B 27/08 | (2006.01) |
| C08J 5/18 | (2006.01) |
| C08L 23/10 | (2006.01) |
| B32B 5/18 | (2006.01) |
| B29C 51/16 | (2006.01) |
| B32B 3/26 | (2006.01) |
| B29C 51/10 | (2006.01) |
| B29K 23/00 | (2006.01) |

(52) U.S. Cl.
CPC . *B29C 51/16* (2013.01); *B32B 3/26* (2013.01); *B32B 27/32* (2013.01); *B29C 51/10* (2013.01); *B29C 2791/006* (2013.01); *B29K 2023/0625* (2013.01); *B29K 2023/0633* (2013.01); *B29K 2023/0641* (2013.01); *B29K 2023/065* (2013.01); *B29K 2023/083* (2013.01); *B29K 2023/12* (2013.01)
USPC .................. 428/515; 428/141; 428/317.7

(58) Field of Classification Search
CPC .......... B32B 27/32; B32B 27/08; B32B 5/18; C08L 2205/02; C08L 23/10; C08J 5/18; C09J 7/0289
USPC ....................... 428/317.3, 515, 141
See application file for complete search history.

(56) References Cited

U.S. PATENT DOCUMENTS

| | | |
|---|---|---|
| 5,366,796 A | 11/1994 | Murschall et al. |
| 5,811,185 A | 9/1998 | Schreck et al. |
| 5,817,412 A | 10/1998 | Lohmann et al. |
| 6,764,760 B2 | 7/2004 | Nishizawa et al. |
| 6,770,361 B2 * | 8/2004 | Kong ............................ 428/354 |
| 6,838,042 B1 * | 1/2005 | Wieners et al. ............... 264/509 |
| 7,144,542 B2 | 12/2006 | Holzer et al. |
| 2002/0176974 A1 * | 11/2002 | Hanyu et al. .................. 428/213 |
| 2008/0044617 A1 | 2/2008 | Schmitz et al. |

FOREIGN PATENT DOCUMENTS

| | | |
|---|---|---|
| EP | 0538747 A1 | 4/1993 |
| EP | 0695630 A1 | 2/1996 |
| EP | 0775574 A2 | 5/1997 |
| EP | 0889381 A2 | 1/1999 |
| WO | WO-98/32598 A1 | 7/1998 |
| WO | WO-02/45956 A1 | 6/2002 |
| WO | WO-2006/040057 A1 | 4/2006 |

* cited by examiner

*Primary Examiner* — Samir Shah
(74) *Attorney, Agent, or Firm* — Drinker Biddle & Reath LLP

(57) ABSTRACT

The invention relates to the use of a multilayered, opaque, biaxially oriented polyolefin film of a vacuole-containing base layer and at least one inner cover layer comprising at least 30-95% by weight of a copolymer and/or terpolymer I having a seal initiation temperature I of 70-105° C. and 5 to 70% by weight of an incompatible polyethylene, each of the specifications in percent by weight being based on the weight of the inner cover layer and the inner cover layer having a seal initiation temperature II of 80 to 110° C.

15 Claims, No Drawings

LABEL FILM FOR DEEP-DRAW PROCESSES

CROSS-REFERENCE TO RELATED APPLICATIONS

This application is a national stage application (under 35 U.S.C. §371) of PCT/EP2008/005302, filed Jun. 28, 2008, which claims benefit of German application 102008033371.6, filed Jul. 18, 2007.

BACKGROUND OF THE INVENTION

The present invention relates to the use of a biaxially oriented polypropylene film as in-mold label in deep drawing.

Label films comprise an extensive and technically complex field. It is differentiated between different labeling techniques, which are entirely different with regard to process conditions and inevitably make different technical demands on label materials. All labeling processes have in common that as final result, optically pleasing labeled containers, in which good adhesion to the labeled container has to be ensured, have to result.

In the labeling processes, very different techniques are used to apply the label. It is differentiated between self-adhesive labels, wrap-around labels, shrink labels, in-mold labels, patch labeling, etc. The use of a film made of thermoplastic material as label is possible in all of these different labeling processes.

In in-mold labeling, it is also differentiated between different techniques, in which different process conditions are used. All in-mold labeling processes have in common that the label takes part in the actual molding process of the container and is applied during the process. However, very different molding processes are used here, such as for example injection molding, blow molding, deep drawing.

In the injection molding process, a label is inserted into the injection mold and back-injected with a plastic melt. By means of the high temperatures and pressures the label bonds to the injection-molded part and becomes an integral, non-detachable component of the injection-molded article. For example tub and lid of ice cream or margarine tubs are produced by this method.

Here, individual labels are taken from a stack or cut from a roll and inserted into the injection mold. The mold is designed in such a way that the melt stream is injected behind the label and the front of the film rests against the wall of the injection mold. During injection molding, the hot melt bonds to the label. After injection molding, the injection mold tool opens, the injection-molded article with label is ejected and cools. As a result, the label has to adhere to the container in wrinkle-free and visually flawless fashion.

During injection, the injection pressure is in a range of 300 to 600 bar. The plastic materials used have a melt flow index of around 40 g/10 min. The injection temperatures depend on the plastic material used. In some cases, the mold is additionally cooled to avoid that the injection-molded article sticks to the mold.

In blow molding of containers or hollow bodies, direct in-mold labeling is also possible. In this method, a molten tube is extruded vertically downwards through a ring-shaped die. A vertically split molding tool closes and encloses the tube, which is thereby squeezed shut at the bottom end. At the top end, a blow mandrel is inserted, through which the opening of the molded piece is formed. Via the blow mandrel, air is supplied to the warm molten tube so that it expands and conforms to the inner walls of the molding tool. In the process, the label has to bond to the viscous plastic material of the molten tube. Afterwards, the mold is opened and the projecting length is cut off at the molded opening. The molded and labeled container is ejected and cools.

In this blow molding process, the pressure during inflation of the molten tube is approx. 4-15 bar and the temperatures are significantly lower than in injection molding. The plastic materials have a lower MFI than in injection molding to form a dimensionally stable molten tube and therefore behave differently in the cooling process than the low-viscosity materials for injection molding.

In deep drawing, unoriented thick plastic sheets, mostly cast PP or PS (polystyrene), of a thickness of approx. 200-750 μm are heated and by means of vacuum or molding plug tools drawn or pressed into an appropriate forming tool. Here as well, the individual label is inserted into the mold and bonds to the actual container during the molding process. Significantly lower temperatures are used, so that adhesion of the label to the container can be a critical factor. Good adhesion has to be ensured even at these low processing temperatures. The processing speeds of this process are lower than with injection molding.

In principle, films made of thermoplastic materials can also be used in deep drawing to label containers during forming. For this, the films must have a selected property profile to ensure that label film and deep-drawn molded article fit snugly to one another in smooth and bubble-free fashion during deep drawing and bond to one another.

Frequently, adhesion of the label to the container is inadequate since in deep drawing, temperatures and pressures which are lower compared to those in injection molding or blow molding processes are used. Furthermore, similar to blow molding, air inclusions between label and container occur, which affect both visual appearance of the labeled container and adhesion. Labels for deep drawing applications are therefore provided with special adhesive layers, which ensure good adhesion to the container.

Such a film is described for example in WO 02/45956. The cover layer of this film has improved adhesive properties compared to various materials. The cover layer comprises as main component a copolymer or terpolymer of an olefin and unsaturated carboxylic acids or esters thereof. It is described that due to the improved adhesion, this film can also be used as label in deep drawing.

WO 2006/040057 describes the use of a biaxially oriented film with a microporous layer as label in deep drawing. The microporous layer comprises a propylene polymer and at least one β-nucleation agent. The microporosity is produced by transforming β-crystalline polypropylene when the film is stretched. The porous structure of the film avoids air inclusions. The adhesion of the film is surprisingly good. The porous film can therefore be advantageously used in deep drawing.

WO 98/32598 describes an in-mold label comprising at least two layers, a sealable cover layer and a base layer. The sealing layer is applied to the surface of the base layer and comprises a polyolefin having a melting temperature of less than 110° C. 25% or less of this polyolefin should melt at a temperature of less than 50° C. It is not explicitly mentioned that this film can also be used in deep drawing processes. The cover layer can be selected from a large variety of different polymers.

EP 0 889 831 describes an in-mold label comprising at least two layers. A first layer is a heat-sealing layer, which is supposed to be activatable at a temperature of 57 to 100° C. The second layer comprises vacuoles and a non-spherical vacuole-initiating particle. The film is supposed to have a thermal conductivity of less than $1.25*10-4$ kcal/sec cm*° C.

As an example for in-mold processes, only blow molding is mentioned. Deep drawing applications do not explicitly follow from the text. The text does not explain what is meant by activation temperature.

U.S. Pat. No. 6,764,760 describes in-mold labels of multi-layered films comprising a base layer, an intermediate layer and a sealable cover layer. As examples for in-mold processes, blow molding, injection molding and deep drawing are mentioned. The sealable layer should be embossed to avoid bubbles. The sealing layer is composed of polyethylene having a melting point of 50-130° C. Optionally, the sealable cover layer can additionally comprise modified polymers such as for example EVA or acrylate-modified polymers.

In prior art, various films are described that in general can be used as in-mold labels. In the disclosed teachings, it is frequently not differentiated between the different forming processes, and it is hence taught that the in-mold labels can be interchangeably and equivalently used in the different processes. Within the scope of the present invention it was found that this is definitely not the case. For example, there are films that work superbly in injection molding but cannot be used in blow molding because of too many bubbles and poor adhesion. Films that work in blow molding exhibit in deep drawing processes an adhesion that is too low. In principle, each forming process requires a special film, the properties of which are optimized for the exact conditions in the respective application.

Those skilled in the art generally proceed on the assumption that the applications become increasingly more critical with respect to bubble formation and adhesion in the order of injection molding, blow molding, deep drawing since the conditions during forming of the container become more "moderate" in this order. In deep drawing, the lowest temperatures and the lowest pressures are used, so that the requirements with regard to label adhesion and bubble-freeness are no longer met by the common in-mold labels in deep drawing applications. To date, in practice in-mold labeling has therefore not prevailed in deep drawing. In practice, deep-drawn containers are either directly printed upon or provided with a wrap-around label.

The few known solutions that meet the requirements technically include complex measures for the production of the film, and hence are simply too expensive to substitute direct printing or wrap-around labels. The acrylate-modified polymers according to WO 02/45956 have such strong adhesion and tack that the film has too strong a tendency to stick to the rollers during production and becomes completely unusable because of blocking on the roll that is too severe. In addition, the film, if processing into a label stack is successful, is not easily unstacked. Attempts to reduce the adhesive force using blends or additives to such an extent that the film can be handled and unstacked during production, processing and application affect the adhesive force in such a way that the film is no longer suitable for deep drawing applications since the adhesion to the container is too low.

The porous film according to WO 2006/040057 can only be produced with extremely slow production speeds since the β-crystallites are only formed in sufficient quantity by slow cooling of the extruded melt. The film according to U.S. Pat. No. 6,764,760 works for the deep drawing application only with the proposed embossing, which as an additional processing step also makes the film more expensive.

The known solutions, which were specifically developed for deep drawing, consequently rely on extreme tack of the film surface or on extreme surface roughness, or on special surface structures. Furthermore, there is a need to provide a film that is suitable for in-mold labeling in deep drawing and meets the requirements with regard to adhesion, unstackability and bubble-freeness and can be produced by the customary cost-effective film production processes.

BRIEF SUMMARY OF THE INVENTION

This object is solved by using a multilayered, opaque, biaxially oriented polyolefin film of a vacuole-containing base layer and at least one inner cover layer, this inner cover layer comprising at least 30-95% by weight of a copolymer and/or terpolymer I having a seal initiation temperature I of 70-105° C. and 5 to 70% by weight of an incompatible polyethylene, each of the specifications in percent by weight being based on the weight of the inner cover layer and the inner cover layer having a seal initiation temperature II of 80 to 110° C. The dependent claims specify preferred embodiments of the invention.

Seal initiation temperature I means the seal initiation temperature measured using a reference film comprising a polypropylene base layer and a cover layer I of approx. 1.5 μm, this cover layer only consisting of the copolymer or terpolymer to be determined or the mixture to be determined and not being surface-treated on the surface. In this measurement, cover layer I is sealed against cover layer T. Optionally, a second cover layer can be applied to the opposite side since it does not affect seal initiation temperature I.

Seal initiation temperature II means the seal initiation temperature measured for the inner cover layer on the label film to be used. In this measurement, inner cover layer is sealed against inner cover layer.

DETAILED DESCRIPTION OF THE INVENTION

Within the scope of the present invention it was found that the film meets all requirements mentioned above when used as in-mold label in the deep drawing process if the inner cover layer comprises said copolymer and/or terpolymer having a low seal initiation temperature I and said copolymer and/or terpolymer is mixed with polyethylene in such a way that seal initiation temperature II of the inner cover layer is in the range of 80 to 110° C., preferably in the range of 90 to 105° C. Surprisingly, the limits for seal initiation temperature II of the inner cover layer have to be observed very closely in order to ensure good adhesion and bubble-freeness. If seal initiation temperature II of the inner cover layer is above 110° C., adhesion of the label worsens abruptly so that films having a seal initiation temperature II of approx. 115° C. become practically unusable for this application. If seal initiation temperature II is too low, i.e. below 80° C., problems as known in principle from films with sticky cover layers occur when processing the film, and the film can no longer be reliably separated during unstacking. The good suitability of the films having a seal initiation temperature II of 80-110° C. for the deep drawing process is particularly surprising in conjunction with the fact that the same film exhibits comparatively poor adhesion and bubbles as label in blow molding.

Mixing copolymers and/or terpolymers I with an incompatible polyethylene produces a surface roughness in a manner known per se, which allows for processability and unstackability. However, it was quite doubtful whether the micro-roughness produced by the incompatibility would be sufficient to ensure processability of the film and unstackability of the label in case of a comparatively very low seal initiation temperature II. It was expected that due to the very low seal initiation temperature II, despite surface roughness, the cover layer would lead to problems during processing due to bonding, blocking, etc. and could not be unstacked reliably. Surprisingly, these problems did not occur however.

Adjusting essential seal initiation temperature II of 80-110° C. can be aided by further measures, for example by process measures or incorporation of further additives, and by controlling the seal initiation temperature via the thickness of the cover layer. Consequently, the surprisingly good usability of the film in the deep drawing process is not solely based on the use of the low-sealing polymers mentioned. In fact, the invention is based on the finding that the low-sealing polymers have to be used in such a way that seal initiation temperature II of the film is in the range of 80-110° C. to ensure good usability as in-mold deep-drawing label.

In principle, it is not understood why the film having this seal initiation temperature has as blow molding label poor adhesion and bubbles, but is advantageously used in the deep-drawing process Hence, overall it was very surprising that this film exhibits very good adhesion between label and container in the application according to the invention as label in thermoforming, that no bubbles occur, the film is superbly unstackable, does not show any tendency to stick to rollers during production, has little tendency to blocking during processing and consequently completely meets the complex requirement profile if the inner cover layer of the film is composed of the polymers mentioned and the seal initiation temperature is 80-110° C.

Within the meaning of the present invention, the inner cover layer is the cover layer that during labeling is facing the container and forms the bond between the deep-drawn container and the label during labeling.

The inner cover layer comprises as components essential for the invention a copolymer and/or terpolymer I of propylene, ethylene and/or butylene units and a polyethylene. Generally, the inner cover layer comprises at least 30 to 95% by weight, preferably 45 to 80% by weight, most preferably 50 to 80% by weight, of copolymer and/or terpolymer I and 5 to 70% by weight, preferably 20 to 55% by weight, most preferably 20 to 55% by weight, of polyethylene, each based on the weight of the inner cover layer.

Suitable copolymers or terpolymers I are composed of ethylene, propylene or butylene units, terpolymers I comprising three different monomers. The composition of copolymers or terpolymers I of the respective monomers can vary within the limits described below. Generally, the copolymers and/or terpolymers comprise more than 50% by weight of propylene units, i.e. they are propylene copolymers and/or propylene terpolymers having ethylene and/or butylene units as comonomers. Copolymers I generally comprise at least 60% by weight, preferably 65 to 97% by weight, of propylene and at most 40% by weight, preferably 3 to 35% by weight, of ethylene or butylene as comonomer. Terpolymers I generally comprise 65 to 96% by weight, preferably 72 to 93% by weight, of propylene and 3 to 34% by weight, preferably 5 to 26% by weight, of ethylene and 1 to 10% by weight, preferably 2 to 8% by weight, of butylene.

Optionally, the copolymers and terpolymers mentioned above can be mixed with one another. Here, the proportions of copolymer to terpolymer can be varied within any desired limits as long as such mixtures exhibit the essential seal initiation temperature I of 70 to 105° C. This mixture is then used in the inner cover layer in the quantities described above for the copolymers and terpolymers.

It is essential for the invention that the portions of copolymer and/or terpolymer I and polyethylene for the inner cover layer are chosen from the ranges mentioned in such a way that seal initiation temperature II of the inner cover layer does not exceed 110° C. Optionally, further measures such as surface treatment, layer thickness and additives are to be chosen in such a way that the requirement of 80-110° C. for seal initiation temperature II is met. Surface treatments generally lead to an increase of seal initiation temperature II, in particular in case of corona treatments. Seal initiation temperature II also increases when the cover layer thickness is reduced, if said thickness varies in the customary range between 0.5-3 μm. Additives normally have a less pronounced influence on seal initiation temperature II, however, antiblocking agents for example can have an influence depending on their particle size.

The copolymers and terpolymers I described above must have a seal initiation temperature I of 70-105° C., preferably 75 to 100° C., so that when mixed with polyethylene, optionally in conjunction with other measures, a seal initiation temperature II of below 110° C. can be realized. Measures that with use of copolymers or terpolymers having a seal initiation temperature I of greater than 105° C. reduce the seal initiation temperature such that a seal initiation temperature II of <110° C. results are not possible. The seal initiation temperature I of at most 105° C. of the copolymers and/or terpolymers is therefore essential for the invention.

Within the meaning of the present invention, seal initiations temperature I of copolymers and terpolymers I means the seal initiation temperature that exists on a biaxially stretched film of a polypropylene base layer with a cover layer having a thickness of approx. 1.5 μm of 100% by weight of the respective copolymer or terpolymer or mixture thereof. For the determination of this value, this film should not be surface-treated since this can affect the value of seal initiation temperature I. Moreover, the cover layer should not comprise customary additives such as antiblocking agents or slip agents which could affect seal initiation temperature I. The determination should be performed with a minimum thickness of the cover layer at which the value is independent of the customary thickness variations, generally between 1 and 2 μm. Seal initiation temperature I itself is determined using this reference film as described in detail in Measurement Methods.

The melt flow index of the copolymers and/or terpolymers is generally 0.1 to 20 g/10 min (190° C., 21.6 N), preferably 0.1 to 15 g/10 min. The melting point can generally be in a range of 70 to 140° C. In a preferred embodiment, copolymers and/or terpolymers are used, the melting point of which is at least 105 up to 140° C., preferably 110 to 135° C. These embodiments are characterized by a particularly good processability both during production and use of the film. It was found that a comparatively high melting point of for example 110-135° C. in conjunction with a low seal initiation temperature I of the copolymer or terpolymer of 75 to 105° C. reduces the tack and blocking tendency of the film to such an extent that the film does not stick to the rollers and can be easily unstacked, but at the same time exhibits excellent adhesion and bubble-freeness in deep drawing.

The second component essential for the invention of the inner cover layer is a polyethylene incompatible with the copolymers and/or terpolymers described above. In this connection, incompatible means that by mixing copolymers and/or terpolymers I with the polyethylene, a surface roughness is formed. The surface roughness Rz is generally in a range of 2.0-6 μm, preferably 3-5 μm, with a cut-off of 0.25 mm. Suitable polyethylenes are for example HDPE or MDPE. HDPE generally has the properties described below, for example an MFI (50 N/190° C.) of greater than 0.1 to 50 g/10 min, preferably 0.6 to 20 g/10 min, measured according to DIN 53 735, and a viscosity number, measured according to DIN 53 728, Part 4, or ISO 1191, in the range of 100 to 450 $cm^3/g$, preferably 120 to 280 $cm^3/g$. The crystallinity is generally 35 to 80%, preferably 50 to 80%. The density, measured at 23° C. according to DIN 53 479, Method A, or ISO 1183, is in the range of >0.94 to 0.96 g/cm$^3$. The melting point, measured using DSC (maximum of the melting curve, heating rate of 20° C./min), is between 120 and 140° C. Suitable MDPE generally has an MFI (50 N/190° C.) of greater than 0.1 to 50 g/10 min, preferably 0.6 to 20 g/10 min, measured according to DIN 53 735. The density, measured at 23° C. according to DIN 53 479, Method A, or ISO 1183, is in the range of >0.925 to 0.94 g/cm$^3$. The melting point, measured using DSC (maximum of the melting curve, heating rate of 20° C/min), is between 115 and 130° C.

Optionally, the inner cover layer can comprise further olefinic polymers in small quantities as long as the functionality, in particular the seal initiation temperature of 80-100° C. essential for the invention, is not interfered with thereby. For example propylene copolymers or terpolymers, which have a seal initiation temperature of greater than 105° C. and are incorporated into the inner cover layer for example via additive batches, are a possibility here.

For the inner cover layer, propylene-butylene copolymers mixed with MDPE or HDPE are preferably used. Preferably, the butylene content of the copolymers is 5 to 20% by weight, and the melting point is in a range of 110-135° C. Particularly preferably, the surface of this inner cover layer is subjected to corona treatment.

The layer thickness of the inner cover layer generally is 2-10 µm, preferably 2.5 to 8 µm, most preferably 3 to 6 µm. An increased cover layer thickness of at least 2.5 µm contributes advantageously to an improved adhesion.

The inner cover layer can additionally comprise customary additives such as neutralizing agents, stabilizers, antistatic agents, antiblocking agents and/or slip agents, each in effective quantities. Each of the specifications below in percent by weight is based on the weight of the inner cover layer. The type and quantity of such additives should be chosen such that seal initiation temperature II is not increased to such a degree that it is above 110° C.

Suitable antiblocking agents are inorganic additives, such as silicon dioxide, calcium carbonate, magnesium silicate, aluminum silicate, calcium phosphate and the like, and/or incompatible organic polymers, such as polyamides, polyesters, polycarbonates and the like, or crosslinked polymers, such as crosslinked polymethyl methacrylate or crosslinked silicone oils. Silicon dioxide and calcium carbonate are preferred. The average particle size is between 1 and 6 µm, in particular between 2 and 5 µm. The effective quantity of antiblocking agent is in the range of 0.1 to 5% by weight, preferably 0.5 to 3% by weight, most preferably 0.8 to 2% by weight.

Slip agents are higher aliphatic acid amides, higher aliphatic acid esters and metallic soaps, as well as polydimethylsiloxanes. The effective quantity of slip agent is in the range of 0.01 to 3% by weight, preferably 0.02 to 1% by weight, based on the inner cover layer. Particularly suitable is the addition of 0.01 to 0.3% by weight of aliphatic acid amides, such as erucic acid amide, or 0.02 to 0.5% by weight of polydimethylsiloxanes, in particular polydimethylsiloxanes having a viscosity of 5,000 to 1,000,000 mm2/s.

The inner cover layer described above can be directly applied to the opaque base layer, or the film has between the opaque base layer and the inner cover layer essential for the invention in addition an intermediate layer. Within the meaning of the present invention, "opaque film" means a non-transparent film, the light transmittance (ASTM-D 1003-77) of which is at most 70%, preferably at most 50%.

The base layer of the film comprises at least 70% by weight, preferably 75 to 99% by weight, most preferably 80 to 98% by weight, each based on the weight of the base layer, of polyolefins or propylene polymers, preferably propylene homopolymers and vacuole-initiating filler materials.

The propylene polymer generally comprises at least 90% by weight, preferably 94 to 100% by weight, most preferably 98 to <100% by weight, of propylene. The respective comonomer content of at most 10% by weight, or 0 to 6% by weight, or 0 to 2% by weight, if present, generally consists of ethylene. Each of the specifications in percent by weight is based on the propylene polymer.

Isotactic propylene homopolymers having a melting point of 140 to 170° C., preferably 150 to 165° C., and a melt flow index (measured according to DIN 53 735 at a load of 21.6 N and 230° C.) of 1.0 to 10 g/10 min, preferably 1.5 to 6.5 g/10 min, are preferred. The n-heptane-soluble portion of the polymer generally is 0.5 to 10% by weight, preferably 2 to 5% by weight, based on the starting polymer. The molecular weight distribution of the propylene polymer can vary. The ratio of weight average Mw to number average Mn generally is between 1 and 15, preferably at 2 to 10, particularly preferably at 2 to 6. Such a narrow molecular weight distribution of the propylene homopolymer of the base layer is achieved for example by its peroxidic degradation or by producing the polypropylene using suitable metallocene catalysts.

The opaque base layer comprises vacuole-initiating filler materials in a quantity of a maximum of 30% by weight, preferably 1 to 15% by weight, most preferably 2 to 10% by weight, based on the weight of the base layer. In addition to the vacuole-initiating filler materials, the base layer can comprise pigments, for example in a quantity of 0.5 to 10% by weight, preferably 1 to 8% by weight, most preferably 1 to 5% by weight. The specifications are based on the weight of the base layer.

Within the meaning of the present invention, pigments are incompatible particles which essentially do not lead to the formation of vacuoles upon stretching of the film. The coloring effect of the pigments is caused by the particles themselves. "Pigments" generally have an average particle diameter of 0.01 to a maximum of 1 µm, preferably 0.01 to 0.7 µm, most preferably 0.01 to 0.4 µm. Pigments comprise both so-called "white pigments", which dye the films white, and "colored pigments", which give the film a multicolored or black color. Common pigments are materials such as for example aluminum oxide, aluminum sulfate, barium sulfate, calcium carbonate, magnesium carbonate, silicates such as aluminum silicate (kaolin) and magnesium silicate (talc), silicon dioxide, and titanium dioxide, among which white pigments such as calcium carbonate, silicon dioxide, titanium dioxide and barium sulfate are preferably used.

The titanium dioxide particles generally consist to at least 95% by weight of rutile and are preferably used with a coat of inorganic oxides and/or of organic compounds with polar and non-polar groups. Such coatings of TiO2 are known in prior art.

Within the meaning of the present invention, "vacuole-initiating filler materials" are solid particles which are incompatible with the polymer matrix and cause the formation of vacuole-like hollow spaces upon stretching of the film; size, nature and number of vacuoles depending upon the size and quantity of the solid particles and the stretching conditions such as stretch ratio and stretching temperature. The vacuoles reduce the density and give the films a characteristic nacreous, opaque appearance, which is produced by light scattering on the interfaces "vacuole/polymer matrix". Light scattering on the solid particles themselves generally contributes comparatively little to the opacity of the film. Normally, the vacuole-initiating filler materials have a minimum size of 1 µm in order to produce an effective, i.e. opaque-making, quantity of vacuoles. The average particle diameter of the particles is generally 1 to 6 µm, preferably 1.5 to 5 µm. The chemical character of the particles plays a secondary role if there is incompatibility.

Common vacuole-initiating filler materials are inorganic and/or organic materials incompatible with polypropylene such as aluminum oxide, aluminum sulfate, barium sulfate, calcium carbonate, magnesium carbonate; silicates such as aluminum silicate (kaolin) and magnesium silicate (talc) and silicon dioxide, among which calcium carbonate and silicon dioxide are preferably used. Suitable as organic filler materials are the customarily used polymers incompatible with the polymer of the base layer, in particular polymers such as HDPE, copolymers of cyclic olefins such as norbornenes or tetracyclododecene with ethylene or propylene, polyesters, polystyrenes, polyamides, halogenated organic polymers; polyesters such as for example polybutylene terephthalates being preferred. Within the meaning of the present invention, "incompatible materials or incompatible polymers" mean that the material or the polymer is present in the film as a separate particle or as a separate phase.

The density of the film can vary in a range from 0.4 to 0.8 g/cm$^3$ depending on the composition of the base layer. Vacuoles contribute to a lowering of the density, whereas pigments, such as for example $TiO_2$, increase the density of the film due to the higher specific weight. Preferably, the density of the film is 0.5 to 0.75 g/cm$^3$.

In addition, the base layer can comprise customary additives such as neutralizing agents, stabilizers, antistatic agents and/or slip agents, each in effective quantities. Each of the specifications below in percent by weight is based on the weight of the base layer.

Preferred antistatic agents are glycerol monostearates, alkali alkane sulfonates, polyether-modified, i.e. ethoxylated and/or propyoxylated, polydiorganosiloxanes (polydialkylsiloxanes, polyalkylphenylsiloxanes and the like) and/or the essentially straight-chain and saturated aliphatic tertiary amines that have an aliphatic radical having 10 to 20 carbon atoms and are substituted with ω-hydroxy-($C_1$-$C_4$)-alkyl groups, N,N-bis-(2-hydroxyethyl)-alkylamines having 10 to 20 carbon atoms, preferably 12 to 18 carbon atoms, in the alkyl radical being especially suitable. The effective quantity of antistatic agent is in the range of 0.05 to 0.5% by weight.

Slip agents are higher aliphatic acid amides, higher aliphatic acid esters, waxes and metallic soaps, as well as polydimethylsiloxanes. The effective quantity of slip agent is in the range of 0.01 to 3% by weight, preferably 0.02 to 1% by weight. The addition of higher aliphatic acid amides in the range of 0.01 to 0.25% by weight in the base layer is particularly suitable. Particularly suitable aliphatic acid amides are eurucic acid amide and stearylamide. The addition of polydimethylsiloxanes in the range of 0.02 to 2.0% by weight is preferred, in particular polydimethylsiloxanes having a viscosity of 5,000 to 1,000,000 mm$^2$/s.

As stabilizers, the customary stabilizing compounds for ethylene, propylene and other olefin polymers can be used. The added quantity is between 0.05 and 2% by weight. Phenolic and phosphitic stabilizers such as tris-(2,6-dimethylphenyl) phosphite are particularly suitable. Phenolic stabilizers having a molar mass of greater than 500 g/mol are preferred, in particular pentaerythritol-tetrakis-3-(3,5-di-tert-butyl-4-hydroxyphenyl) propionate or 1,3,5-trimethyl-2,4,6-tris(3,5-di-tert-butyl-4-hydroxybenzyl)benzene. Phenolic stabilizers alone are used in a quantity of 0.1 to 0.6% by weight, in particular 0.1 to 0.3% by weight, phenolic and phosphitic stabilizers are used in a ratio of 1:4 to 2:1 and in a total quantity of 0.1 to 0.4% by weight, in particular 0.1 to 0.25% by weight.

Neutralizing agents are preferably dihydrotalcite, calcium stearate and/or calcium carbonate having an average particle size of at most 0.7 µm, an absolute particle size of less than 10 µm, and a specific surface of at least 40 m$^2$/g. Generally, 0.02 to 0.1% by weight are added.

The polyolefin film according to the invention preferably has a second, outer cover layer on the side opposite the inner cover layer exhibiting good adhesion to common printing inks, adhesives, and coatings and/or lacquers. Here as well, an intermediate layer can optionally be applied (outer intermediate layer). To further improve adhesion of printing inks, adhesives and coatings it is preferred to perform a corona, plasma or flame treatment on the surface of the outer cover layer.

Generally, the outer cover layer is composed of polymers of olefins having 2 to 10 carbon atoms. The outer cover layer generally comprises 95 to 100% by weight of polyolefin, preferably 98 to <100% by weight of polyolefin, each based on the weight of the cover layer(s).

Examples for suitable olefinic polymers of the cover layer(s) are propylene homopolymers, copolymers or terpolymers II of ethylene, propylene and/or butylene units or mixtures of the polymers mentioned. These copolymers or terpolymers II do not comprise carboxylic acid monomers (or esters thereof). They are polyolefins. Among the preferred polymers are:

random ethylene-propylene copolymers having an ethylene content of 1 to 10% by weight, preferably 2.5 to 8% by weight, or random propylene-butylene-1 copolymers having a butylene content of 2 to 25% by weight, preferably 4 to 20% by weight, or random ethylene-propylene-butylene-1 terpolymers having an ethylene content of 1 to 10% by weight and a butylene-1 content of 2 to 20% by weight, or a mixture or a blend of ethylene-propylene-butylene-1 terpolymers and propylene-butylene-1 copolymers having an ethylene content of 0.1 to 7% by weight and a propylene content of 50 to 90% by weight and a butylene-1 content of 10 to 40% by weight. Each of the specifications in percent by weight is based on the weight of the polymer.

The copolymers and terpolymers II used in the outer cover layer and described above generally have a melt flow index of 1.5 to 30 g/10 min, preferably of 3 to 15 g/10 min. The melting point is in the range of 120 to 145° C. The blend of copolymers and terpolymers II described above has a melt flow index of 5 to 9 g/10 min and a melting point of 120 to 150° C. All melt flow indices specified above are measured at 230° C. and with a load of 21.6 N (DIN 53 735). Optionally, all cover layer polymers described above can be peroxidically or thermooxidatively degraded, the degradation factor generally being in a range of 1 to 15, preferably 1 to 8.

Optionally, the additives described above such as antistatic agents, neutralizing agents, slip agents and/or stabilizers, as well as optionally additionally antiblocking agents can be added to the outer cover layer(s). Then, the specifications in percent by weight are based correspondingly on the weight of the cover layer.

Suitable antiblocking agents have already been described in connection with the inner cover layer. These antiblocking agents are also suitable for the outer cover layer. The preferred quantity of antiblocking agent is for the outer cover layer in the range of 0.1 to 2% by weight, preferably 0.1 to 0.8% by weight.

The thickness of the outer cover layer is generally greater than 0.1 μm and is preferably in the range of 0.1 to 5 μm, in particular 0.3 to 2 μm.

In a particularly preferred embodiment, the surface of the outer cover layer is corona-treated, plasma-treated or flame-treated. This treatment improves the adhesion characteristics of the film surface for subsequent decoration or printing, i.e. it ensures the wettability with and adhesion of printing inks and other decorating materials.

The film according to the invention comprises at least the base layer described above and the inner cover layer, and preferably a second, outer cover layer applied to the opposite surface. Preferably, intermediate layer(s) can be present between base layer and cover layer(s) on one side or on both sides. Hence, two-, three-, four- and five-layered embodiments are possible.

The intermediate layer(s) can be composed of the olefinic polymers, preferably propylene polymers, described for the base layer and for the cover layers. The intermediate layer(s) can comprise the customary additives described for the individual layers such as antistatic agents, neutralizing agents, slip agents and/or stabilizers. The thickness of this intermediate layer is greater than 0.5 μm and is preferably in the range of 0.6 to 6 μm, in particular 1 to 4 μm.

The intermediate layer, which can be applied between the outer cover layer and the base layer in a preferred embodiment (referred to as outer intermediate layer below), contributes to a high gloss on the outer surface of the opaque label, in particular unfilled (i.e. without vacuole-initiating filler materials and without $TiO_2$) outer intermediate layers of propylene homopolymer. For embodiments where a white or opaque appearance (high opacity) of the label is desired, the outer intermediate layer comprises vacuole-initiating filler materials and/or pigments, in particular $TiO_2$, for example in a quantity of 2 to 8% by weight. The thickness of this outer intermediate layer is greater than 0.3 μm and is preferably in the range of 1.0 to 15 μm, in particular 1.5 to 10 μm.

The total thickness of the label film according to the invention can vary within wide limits and depends on the intended use. It is preferably 15 to 150 μm, more preferably 20 to 100 μm, most preferably 25 to 90 μm. The base layer accounts for about 40 to 99% of the total film thickness.

The invention further relates to a method for producing the polyolefin film according to the invention by the coextrusion process known per se. In the course of this process, the melts corresponding to the individual layers of the film are coextruded simultaneously and jointly through a flat die; the film thus obtained is taken off on one or more roller(s) for solidification; subsequently, the film is stretched (oriented); the stretched film is thermally set and optionally plasma-treated, corona-treated or flame-treated on the surface layer provided for treatment.

Biaxial stretching (orientation) is performed either sequentially or simultaneously. Sequential stretching is generally performed successively, the successive biaxial stretching, in which it is first stretched longitudinally (in the machine direction) and then transversely (perpendicular to the machine direction), being preferred. The production of the film is further described using the example of a flat film extrusion with subsequent sequential stretching.

First, as is customary in the extrusion process, the polymer or the polymer mixture of the individual layers is compressed and liquefied in an extruder; the optionally added additives can already be contained in the polymer or polymer mixture in this step. The melts are then simultaneously pressed through a flat die (flat sheet die), and the pressed out multi-layered film is taken off on one or more take off rollers at a temperature of 10 to 100° C., preferably 10 to 50° C. whereupon it cools and solidifies.

The thus obtained film is then stretched longitudinally and transversely to the extrusion direction, which leads to an orientation of the molecular chains. The longitudinal stretching is preferably performed at a temperature of 70 to 130° C., preferably 80 to 110° C., advantageously by means of two rollers running at different speeds corresponding to the intended stretch ratio, and the transverse stretching is preferably performed at a temperature of 120 to 180° C. by means of an appropriate tenter frame. The longitudinal stretch ratios are in the range of 3 to 8, preferably 4 to 6. The transverse stretch ratios are in the range of 5 to 10, preferably 7 to 9.

The stretching of the film is followed by its thermosetting (heat treatment), the film being maintained for about 0.1 to 10 s at a temperature of 100 to 160° C. Subsequently, the film is wound up in customary fashion by means of a winding device.

Preferably, one or both surface(s) of the film is/are plasma-treated, corona-treated or flame-treated by one of the known methods after biaxial stretching. The intensity of the treatment is generally in the range of 35 to 50 mN/m, preferably 37 to 45 mN/m.

During the corona treatment it is advantageously proceeded in such a way that the film is guided between two conductor elements serving as electrodes, such a high voltage, for the most part alternating voltage (about 5 to 20 kV and 5 to 30 kHz), being applied between the electrodes that spray or corona discharges can take place. By means of the spray or corona discharge, the air above the film surface is ionized and reacts with the molecules of the film surface, so that polar intercalations are formed in the essentially non-polar polymer matrix.

The surface treatment, such as corona treatment, can occur both right away during the production of the label film and at a later time, for example immediately prior to the labeling process.

According to the invention, the label film is used in deep drawing processes for labeling containers made of plastic materials, adhesives or adhesion promoters, coatings or similar aids not having to be applied to the inner surface in a separate process step after film production. Furthermore, embossing of the inner surface is not necessary.

The containers made of thermoplastic polymer to be labeled are formed from sheets by deep drawing. Depending on the demands on the container, for example polypropylene (PP) or high-density or low-density polyethylene (HD-PE or LD-PE or LLD-PE), in particular cases also mixtures of these polymers, are used as thermoplastic polymers for the container. There are no restrictions with regard to the shape of the container as long as the containers can be produced by the thermoforming process. Cup-shaped and bowl-shaped containers in particular fall in this category.

To label the container with the label film according to the invention, the label is cut and stacked prior to forming the container. The individual label is taken from the stack and inserted into the mold in such a way that the, generally printed, outer surface of the label is in contact with the mold and later constitutes the visible side of the container. The inner surface of the label faces the container. During the forming of the container, i.e. in the deep drawing process, the inner surface of the label bonds to the container as a result of the effects of pressure and temperature.

In suitable deep drawing processes, sheets made of thermoplastic polymers are plastically molded at elevated temperature under the influence of pneumatic forces or by mechanical action of molding tools. Plastic molding using pneumatic forces can occur by means of low pressure (deep drawing) or excess pressure, i.e. compressed air. Such methods are known in prior art and are referred to as thermoforming. The methods and the implementation thereof are described in detail for example in Rosato's Plastics Encyclopedia and Dictionary, pp. 755 to 766, which is incorporated herein by reference.

Plastic molding under the influence of pneumatic forces occurs for example using low pressure after the film or sheet to be deep-drawn has been customarily pre-formed using a top force. Prior to the actual deep drawing, the label film is inserted into the mold and the deep drawing film is placed on top of it in such a way that the mold body is hermetically sealed. Low pressure or vacuum is applied to the mold body in suitable manner. Due to the pressure difference, the deep drawing film is under the effect of suction. A heating element is placed above the film surface and heats the film until it deforms in the direction of the mold body. Temperature, low pressure are chosen in the process in such a way that the film form-fittingly rests against the mold body with the inserted label and thereby bonds to the label. After eliminating the pressure difference and cooling, the labeled deep-drawn container can be removed.

For the characterization of the raw materials and films, the following measurement methods were utilized:

Melt Flow Index

The melt flow index of the propylene polymers was measured according to DIN 53 735 with a 2.16 kg load and at 230° C., and at 190° C. and with 2.16 kg for polyethylene.

Melting Points

DSC measurement, maximums of the melting curve, heating rate of 20 K/min.

Density

The density was determined according to DIN 53 479, Method A.

Determination of the Seal Initiation Temperature (SIT)

Two film strips are cut and are placed on top of each other with the respective cover layers to be tested. Using the sealing apparatus HSG/ETK by Brugger, heat-sealed samples (sealed seam 20 mm×100 mm) are prepared by sealing the strips placed on top of each other at different temperatures using two heated sealing bars at a sealing pressure of 10 N/cm$^2$ and a sealing duration of 0.5 s. Test strips having a width of 15 mm are cut from the sealed samples. The seal strength, i.e. the force required to separate the test strips, is determined with a tensile testing machine using a take-off speed of 200 mm/min, the plane of the sealed seam forming a right angle with the pulling direction. The seal initiation temperature is the temperature at which a seal strength of at least 1.0 N/15 mm is achieved.

Roughness Measurement

As a measure for the roughness of the inner surfaces of the films, the roughness value Rz of the films were measured in accordance with DIN 4768 Part 1 and DIN 4777 and DIN 4772 and 4774 with a perthometer type S8P by Feinprüf Perthen GmbH, Göttingen, Germany, using the contact stylus method. The measuring head, a single-skid pick-up in accordance with DIN 4772, was equipped with a stylus having the radius of 5 μm and a flank angle of 90° with a tracking force of 0.8 to 1.12 mN and a skid with a radius of 25 mm in the sliding direction. The vertical measuring range was adjusted to 62.5 μm, the tracing length to 5.6 mm and the cut-off of the RC filter according to DIN 4768/1 to 0.25 mm.

The invention will now be explained using the following examples.

EXAMPLE 1

By the coextrusion method, a five-layered prefilm was extruded through a flat sheet die. This prefilm was taken off on a cooling roller, solidified, and subsequently oriented in the longitudinal and transverse direction, and finally set. The surface of the outer cover layer was pre-treated by means of corona in order to increase the surface tension. The five-layered film had a layer structure of first cover layer/first intermediate layer/base layer/second intermediate layer/second cover layer. The individual layers of the film had the following composition:

First cover layer (1.0 μm):
100% by weight of ethylene-propylene copolymer with an ethylene content of 4% by weight (based on the copolymer) and a melting point of 135° C.; and a melt-flow index of 7.3 g/10 min at 230° C. and a load of 2.16 kg (DIN 53 735).

First intermediate layer (4 μm):
96% by weight of propylene homopolymer (PP) with an n-heptane-soluable portion of 4.5% by weight (based on 100% PP) and a melting point of 165° C.; and a melt-flow index of 3.2 g/10 min at 230° C. and a load of 2.16 kg (DIN 53 735)
4% by weight of TiO2 with an average particle diameter of 0.1 to 0.3 μm Base Layer
89.6% by weight of propylene homopolymer (PP) with an n-heptane-soluable portion of 4.5% by weight (based on 100% PP) and a melting point of 165° C.; and a melt-flow index of 3.2 g/10 min at 230° C. and a load of 2.16 kg (DIN 53 735), and
10% by weight of calcium carbonat with an average particle diameter of 3.5 μm
0.2% by weight of tertiary aliphatic amine as antistatic agent (Armostat 300)
0.2% by weight of eurucic acid amide as slip agent (FAA)

Second intermediate layer (4 μm)
100% by weight of propylene homopolymer (PP) with an n-heptane-soluable portion of 4.5% by weight (based on 100% PP) and a melting point of 165° C.; and a melt-flow index of 3.2 g/10 min at 230° C. and a load of 2.16 kg (DIN 53 735)

Second cover layer (3 μm)
50% by weight of propylene-butylene copolymer with a butylene content of 25.7 mol% (based on the copolymer) and a melting point of 110° C.; and a melt-flow index of 7.0 g/10 min at 230° C. and a load of 2.16 kg (DIN 53 735). The seal initiation temperature I of the propylene-butylene copolymer is 82° C. with a cover layer thickness of approx. 1.5 μm
50% by weight of polyethylene with a density of 0.934 g/cm$^3$ and a melt-flow index (190° C. and 50 N) of 0.8 g/10 min All layers of the film additionally comprised stabilizer and neutralizing agent in customary quantities.

In detail, the following conditions and temperatures were selected during the production of the film:

| | |
|---|---|
| Extrusion: | extrusion temperature approx. 250° C. |
| Cooling roller: | temperature 25° C. |
| Longitudinal stretching: | T = 120° C. |
| Longitudinal stretching by | factor 5 |
| Transverse stretching: | T = 150° C. |
| Transverse stretching by | factor 8 |
| Setting: | T = 133° C. |

The film was surface-treated by means of corona on the surface of the outer cover layer. The film had a density of 0.58 g/cm³ and a thickness of 40 μm.

EXAMPLE 2

A film was produced in accordance with Example 1. In contrast to Example 1, the second cover layer comprised 75% by weight of propylene-butylene copolymer with a butylene content of 30 mol % (based on the copolymer) and a melting point of 130° C.; and a melt flow index of 5.0 g/10 min at 230° C. and a load of 2.16 kg (DIN 53 735) and 25% by weight of the same polyethylene. The seal initiation temperature I of the propylene-butylene copolymer is 76° C. with a cover layer thickness of approx. 1.5 μm. The remaining composition and the process conditions during the production of the film were not changed.

EXAMPLE 3

A film was produced as described in Example 1. In contrast to Example 1, the film was also surface-treated by means of corona on the surface of the inner cover layer. The remaining composition and the process conditions during the production of the film were not changed.

COMPARATIVE EXAMPLE 1

A film was produced in accordance with Example 1. In contrast to Example 1, the second cover layer now comprised 50% by weight of propylene-ethylene copolymer with an ethylene content of 4% by weight (based on the copolymer) and a melting point of 136° C.; and a melt flow index of 7.3 g/10 min at 230° C. and a load of 2.16 kg (DIN 53 735) and 50% by weight of the same polyethylene as described in Example 1. The seal initiation temperature I of the propylene-ethylene copolymer is 115° C. with a cover layer thickness of approx. 1.5 μm. The remaining composition and the process conditions during the production of the film were not changed.

COMPARATIVE EXAMPLE 2

A film was produced in accordance with Example 2. In contrast to Example 2, the second cover layer now comprised 100% by weight of the same propylene-butylene copolymer and no polyethylene.

COMPARATIVE EXAMPLE 3

A film was produced in accordance with Example 2. In contrast to Example 2, the second cover layer now comprised 25% by weight of propylene-butylene copolymer and 75% by weight of the polyethylene as described in Example 2. The remaining composition and the process conditions during the production of the film were not changed.

COMPARATIVE EXAMPLE 4

A film was produced in accordance with Example 1. In contrast to Example 1, now the cover layer thickness was 1.5 μm. The remaining composition and the process conditions during the production of the film were not changed.

COMPARATIVE EXAMPLE 5

A film was produced in accordance with Example 2. In contrast to Example 2, the film was also surface-treated by means of corona on the surface of the inner cover layer. The remaining composition and the process conditions during the production of the film were not changed.

| No. | Example | SIT I/MP of the copolymer | SIT II of the inner cover layer | Layer thickness of the inner cover layer |
|---|---|---|---|---|
| Ex. 1 | 50% of C3C4 with 25% of C4 50% of PE without corona | 82° C. | 95° C. | 3 μm |
| Ex. 2 | 75% of C3C4; 27% of C4 25% of PE without corona | 76° C. | 106° C. | 3 μm |
| Ex. 3 | 50% of C3C4 with 25% of C4 50% of PE with corona | 82° C. | 104° C. | 3 μm |
| CE 1 | 50% of C3C4; 27% of C4 50% of PE without corona | 115° C. | 121° C. | 3 μm |
| CE 2 | 100% of C3C4; 27% of C4 without corona | 76° C. | 76° C. | 3 μm |
| CE 3 | 25% of C3C4; 27% of C4 75% of PE without corona | 76° C. | 125° C. | 3 μm |
| CE 4 | 50% of C3C4 with 25% of C4 50% of PE without corona, thin | 82° C. | 115° C. | 1.5 μm |
| CE 5 | 75% of C3C4; 27% of C4 25% of PE with corona | 76° C. | 136° C. | 3 μm |

Use According to the Invention

The films according to the Examples and Comparative Examples were used as label films in the deep drawing of a round, cone-shaped yoghurt cup. For this, the labels were die-cut in an arched shape and the cuttings were stacked and stocked in a magazine on the deep-drawing apparatus. The deep-drawing apparatus was equipped with a top force as forming aid. The labels were removed from the magazine by suction, and wound around an auxiliary mandrel. The label preformed in this manner was inserted into the mold by means of the auxiliary mandrel, and held by suction. The outer, printed cover layer was in contact with the mold. The inner cover layer faced the container to be formed.

A PP deep drawing film having a thickness of 600 μm was heated to the range of its plastic moldability (>165° C.) using an IR radiator or a contact-heating unit. By lowering the top force and applying a vacuum to the bottom side and compressed air to the top side, the deep drawing film was formed into a cup, the film bonding to the label in the process.

The labeled container was inspected with regard to adhesion and visual appearance. It became apparent that films in accordance with the Comparative Examples exhibited considerable bubble formation between film and container wall and as a result of this exhibited poor adhesion.

Films in accordance with Examples 1-3 exhibited a homogeneous appearance of the label surface without bubble formation or any other visual defects, and good adhesion of the label to the container surface.

COMPARATIVE EXAMPLE

Films in accordance with Examples 1 to 3 were cut into label form, provided on a blow molding machine, and inserted into the mold prior to the blow, molding process. A blow molding machine was equipped with a tool for a bulgy bottle. The blow molding machine was charged with HD-PE blow molding material having an MFI of 0.4 g/10 min. The HDPE was extruded through a ring-shaped die in tubular form at a temperature of approx. 200° C. The mold was closed, and the bottom end of the molten tube was thereby sealed. A lance was inserted into the top end of the tube, and the tube was inflated in the mold with a pressure of 10 bar. Subsequently, the mold was separated, and the labeled container was removed.

The labeled container exhibited several defects in the form of trapped air bubbles and insufficient adhesion at the edges of the label.

The invention claimed is:

1. An in-mold label which comprises an opaque biaxially oriented polyolefin film which comprises a vacuole-containing base layer and at least one inner cover layer and wherein said at least one inner cover layer comprising at least 30-95% by weight of a copolymer and/or terpolymer I having a seal initiation temperature I of 70-105° C. and 5 to 70% by weight of an incompatible polyethylene, each of the specifications in percent by weight being based on the weight of the inner cover layer, wherein said inner cover layer has a seal initiation temperature II of 80 to 110° C., wherein the seal initiation temperature I and the seal initiation temperature II refer to the temperature at which a seal strength of at least 1.0N/15 mm is achieved and wherein said copolymer comprises 65 to 97% by weight of propylene and 3 to 35% by weight of ethylene or butylene as comonomer and said terpolymer I comprises 72 to 93% by weight of propylene, 5 to 26% by weight of ethylene, and 2 to 8% by weight of butylene and said copolymer and said terpolymer I have a seal initiation temperature I of 75 to 100° C. and wherein an intermediate layer of propylene polymers is disposed between the base layer and the inner cover layer and wherein the surface roughness Rz of the inner cover layer is in a range of 2.0-6 μm, with a cut-off of 0.25 mm.

2. The label according to claim 1, wherein the inner cover layer comprises 45 to 80% by weight of the copolymer and/or terpolymer and 20 to 55% by weight of the polyethylene.

3. The label according to claim 2, wherein the copolymer and/or terpolymer is a propylene copolymer and/or propylene terpolymer.

4. The label according to claim 2, wherein the copolymer is a propylene-butylene copolymer and the polyethylene is MDPE.

5. The label according to claim 1, wherein the polyethylene is HDPE or MDPE.

6. The label according to claim 1, wherein the copolymer is a propylene-butylene copolymer and the polyethylene is MDPE.

7. The label according to claim 6 wherein the inner cover layer has a thickness of 2 to 10 μm.

8. The label according to claim 1, wherein the copolymer or terpolymer has a melting point of 105 to 140° C.

9. The label according to claim 1, wherein the inner cover layer has a thickness of 2 to 10 μm.

10. The label according to claim 9, wherein the density of the film is in a range of 0.2 to 0.80 g/cm³.

11. The label according to claim 1, wherein the density of the film is in a range of 0.2 to 0.80 g/cm³.

12. The label according to claim 11, wherein the surface roughness Rz of the inner cover layer is in a range of 3-5 μm, with a cut-off of 0.25 mm.

13. The label according to claim 1, wherein a second, printable cover layer is applied to the side opposite the inner cover layer.

14. A process for producing a labeled container by means of deep drawing wherein the label according to claim 1 is inserted into a mold, and a deep-drawable sheet is heated using heating elements to a temperature at which the polymer can be thermoplastically molded, and subsequently the sheet is drawn into a mold by means of a molding tool or pneumatically so that the film conforms to the mold and a container is formed and simultaneously the inserted label is applied.

15. An in-mold label which comprises an opaque biaxially oriented polyolefin film which comprises a vacuole-containing base layer and at least one inner cover layer and wherein said at least one inner cover layer comprising at least 30-95% by weight of a copolymer and/or terpolymer I having a seal initiation temperature I of 70-105° C. and 5 to 70% by weight of an incompatible polyethylene, each of the specifications in percent by weight being based on the weight of the inner cover layer, wherein said inner cover layer has a seal initiation temperature II of 80 to 110° C., wherein the seal initiation temperature I and the seal initiation temperature II refer to the temperature at which a seal strength of at least 1.0 N/15 mm is achieved and wherein said copolymer comprises 65 to 97% by weight of propylene and 3 to 35% by weight of ethylene or butylene as comonomer and said terpolymer I comprises 72 to 93% by weight of propylene, 5 to 26% by weight of ethylene, and 2 to 8% by weight of butylene and said copolymer and said terpolymer I have a seal initiation temperature I of 75 to 100° C. and wherein the surface roughness Rz of the inner cover layer is in a range of 3-5 μm, with a cut-off of 0.25 mm and wherein an intermediate layer of propylene polymers is disposed between the base layer and the inner cover layer.

* * * * *